United States Patent [19]

Fisch

[11] Patent Number: 4,852,390
[45] Date of Patent: Aug. 1, 1989

[54] WHEEL RIM LEAK DETECTION

[75] Inventor: Alfred C. Fisch, Clarkston, Mich.

[73] Assignee: Oakland Engineering, Inc., Mich.

[21] Appl. No.: 222,018

[22] Filed: Jul. 21, 1988

[51] Int. Cl.[4] .............................................. G01M 3/24
[52] U.S. Cl. ................................................. 73/40.5 A
[58] Field of Search ....................... 73/40, 40.5 A, 40.7

[56] References Cited

U.S. PATENT DOCUMENTS

| | | |
|---|---|---|
| 3,266,296 | 8/1966 | Hall ............................. 73/40.5 A X |
| 4,523,452 | 6/1985 | Brayman ............................. 73/49.2 |
| 4,532,795 | 8/1985 | Brayman et al. ......................... 73/40 |
| 4,754,638 | 7/1988 | Brayman et al. ....................... 73/40.7 |

FOREIGN PATENT DOCUMENTS 2000300 1/1979 United Kingdom ................. 73/40.7

*Primary Examiner*—Stewart J. Levy
*Assistant Examiner*—Joseph W. Roskos
*Attorney, Agent, or Firm*—Barnes, Kisselle, Raisch, Choate, Whittemore, Hulbert

[57] ABSTRACT

Method and apparatus for testing leak integrity of a workpiece such as a wheel rim in which the rim is positioned within a air-tight housing with the axial rim edges in sealing engagement with opposed wall portions of the housing so as to form first and second chambers within the housing internally and externally of the rim. One of such chambers is supplied with air under pressure from a tank which is precharged during the workpiece transfer process. Microphones are positioned in the other chamber for detecting leakage of air through the rim as a function of intensity of ultrasonic radiation emitted thereby. Gross leaks are detected by connecting the pressurized chamber to an air supply through an orifice, and detecting ultrasonic radiation resulting from flow of make-up air through the orifice.

10 Claims, 2 Drawing Sheets

WHEEL RIM LEAK DETECTION

The present invention is directed to detection of air leaks in workpieces, and more particularly to a method and apparatus for testing leak integrity in preformed wheel rims.

It is conventional in the art of steel wheel manufacture to form a wheel rim by rolling sheet stock into a hoop in which the stock ends are butt welded to each other, and then forming desired rim contour using rollers or die segments. Such contour-forming operation involves substantial movement of stock material, particularly for tubeless tire rims, stressing and sometimes cracking the butt weld. Butt welds which are either improperly initially formed and/or over stressed and fractured during the rim-contouring operation are a major source of air loss to inflated tires mounted thereon, and consequently a major source of warranty claims against the vehicle and/or wheel manufacturer. Previous techniques for quality control inspection of the rim butt weld, such as x-ray inspection, are time consuming and expensive, and therefore can not be readily employed for one hundred percent inspection on a mass production basis.

The problem of rim leakage discussed immediately above, although particularly acute in connection with butt-welded steel wheel rims, also arises in conjunction with compression-molded fiber-reinforced resin wheels, and cast or forged aluminum alloy wheels. Furthermore, in the case of rolled and butt-welded steel wheel rims, there is a danger of burn-through and consequent leakage when the wheel disc is internally welded to the wheel rim. In some wheels for frontwheel drive vehicles, the wheel mounting disc includes the outboard tire bead-retaining flange, and the rim is spun or arc welded thereto to form a complete wheel rim and disk assembly. There is thus a need for inexpensive, accurate and rapid testing of all types of vehicle wheel rims, both with and without a wheel disc, against air leakage therethrough.

It has heretofore been proposed to test for burn-through leaks in closed and semi-closed sheet metal structures ultrasonically in a sound-proof enclosure. In a device heretofore marked by applicant's assignee, a transfer line sequentially feeds a plurality of closed or semi-closed workpieces, such as oil pans, valve covers or catalytic converter housings, to a test station. An elevator at the test station lifts each workpiece in sequence from the transfer line to an elevated position in which the workpiece is disposed within and enclosed by a sound chamber. An air supply selectively feeds air under pressure into the workpiece enclosed in the chamber, and one or more microphones ultrasonically detect air leakage from within the workpiece. The sound chamber is formed by a cup-shaped enclosure wall having an open bottom edge which sealingly engages the elevator in the upper or test position of the latter.

Automated test apparatus of the described character, for leak-testing wheel rims and other closed and semi-closed sheet metal structures, have enjoyed substantial commercial acceptance and success. However, further improvements remain desirable. In particular, as in all automated processes, there is a continuing desire to reduce workpiece cycle time, and thereby increase throughput of workpieces through the test apparatus. It has also been found that, while such apparatus efficiently detects small leaks in workpieces as a function of ultrasonic radiation resulting from passage of air through the small leaks, gross leaks through large openings are not efficiently detected because passage of air through such large openings does not produce ultrasonic radiation which can be detected by the apparatus microphones. It is an object of the present invention to address these areas of desired improvement.

The invention, together with additional objects, features and advantages thereof, will be best understood from the following description, the appended claims and the accompanying drawing in which:

Figure 1:
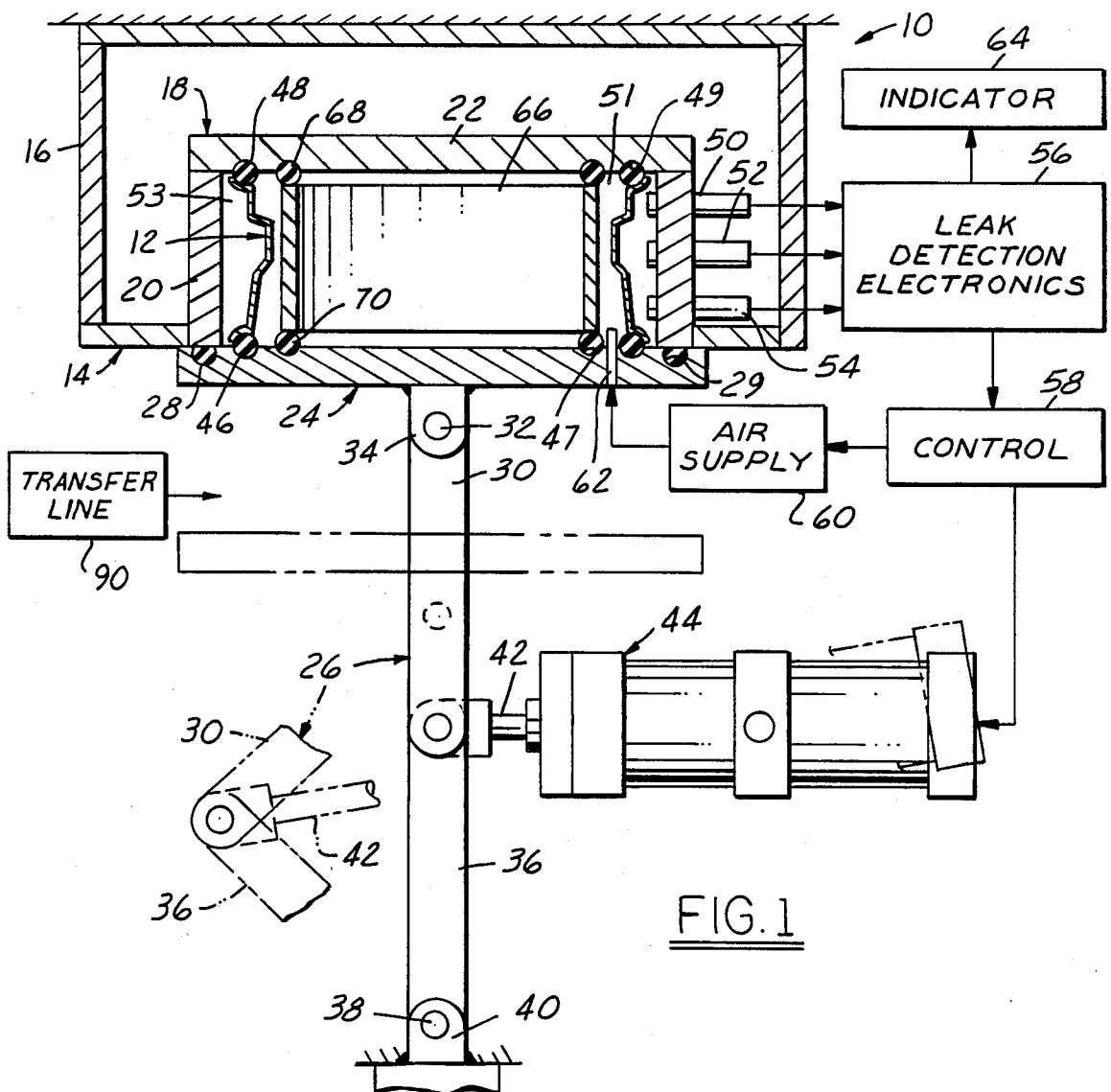
FIG. 1 is a side sectional view illustrating apparatus for testing leak integrity of a wheel rim in accordance with one presently preferred implementation of the invention.

FIG. 1 illustrates apparatus 10 in accordance with one presently preferred implementation of the invention for testing a preformed butt-welded wheel rim 12 for air leakage through the butt weld. Apparatus 10 includes a housing 14 having a closed external wall 16 mounted (by means not shown) in fixed position above a rim transfer line. An internal housing section 18 comprises a sidewall 20 and a top wall 22, housing 18 being thus essentially cup-shaped and opening in the downward direction. An elevator plate 24 is carried by a linkage assembly 26 (and guided by means not shown) for vertical movement beneath housing 14 from a lowered or retracted position illustrated in phantom to an upper or test position illustrated in solid lines. In such upper position, an annular sealing gasket 28 carried within a corresponding channel or groove 29 on the upper surface of plate 24 engages the lower edge of sidewall 20 so as to close housing 18 and thereby form a sealed test enclosure.

Linkage assembly 26 includes a first link 30 pivotally coupled at its upper end 32 to a bracket 34 centrally depending from plate 24. A second link 36 is pivotally coupled at its lower end 38 to a fixed bracket 40 positioned beneath plate 24 in vertical alignment with bracket 34. The other ends of links 30, 36 are pivotally coupled to each other at an end of the rod 42 of an actuator 44, which may be electric, pneumatic or hydraulic. Thus, when rod 42 is extended to the position shown in phantom FIG. 1, elevator plate 24 is retracted beneath housing 14 for placement of a test rim thereon. Withdrawal of rod 42 into actuator 44 in the energized position illustrated in solid lines in FIG. 1 lifts rim 12 to the test position within housing 18. A pair of annular seals 46, 48 are respectively carried in opposed coaxial positions in the channels 47, 49 on the upper surface of plate 24 and a lower surface of housing wall 22 respectively for compressive sealing engagement with opposed edges of test rim 12 positioned therebetween, thereby effectively forming first and second chambers 51, 53 within housing 18 internally and externally of the wheel rim.

A plurality of microphones 50, 52, 54 are positioned on sidewall 20 and project into inner housing 18. Most preferably, microphones 50, 52, 54 are in axial alignment with each other and are radially aligned with the butt weld of rim 12 when the latter is fixtured within housing 18. Microphones 50-54 are of a type which detect ultrasonic radiation to provide corresponding electrical signals to the leak detection electronics 56 as a function of intensity of such radiation. Detection electronics 56 is coupled to control electronics 58 for selectively energizing actuator 44, and to an air supply 60 for selectively feeding air under pressure through a nozzle 62 carried by plate 24 to chamber 51 internally of test rim 12.

In the presently preferred implementation of the invention, test workpieces, specifically wheels 12, are fed to apparatus 10, and withdrawn from apparatus 10 and fed to reject or further processing stations, by means of a fully automatic indexing transfer line 90 (FIG. 1). Such transfer line is disclosed in copending application Ser. No. 082,537, filed Aug. 7, 1987 and assigned to the assignee hereof. The disclosure of such copending application is incorporated herein by reference.

In operation, wheel rim 12 is preferably pre-sprayed with a surfactant for enhancing emission of ultrasonic radiation in the event of air leakage therethrough. Rim 12 is then placed on elevator plate 24 with one edge in engagement with seal 46 and with the rim butt weld in a position for radial opposition to microphones 50-54. Actuator 44 is then energized and plate 24 propelled upwardly so that the opposing edge of rim 12 engages seal 48, rim 12 being compressed between seals 46, 48 and thereby forming internal and external sound chambers 51, 53 as previously described. Air is then supplied under pressure through nozzle 62, and any leakage through cracks or apertures in the rim butt weld (or anywhere else in the rim) is manifested by ultrasonic energy detected by one or more of the microphones 50-54. Electrical signals resulting therefrom are compared to predetermined thresholds, and a failed test is indicated at indicator 64 here appropriate. In the embodiment of the invention illustrated in FIG. 1 for testing wheel rims prior to affixation of the mounting disc thereto, an annular insert 66 is preferably positioned within the wheel rim in engagement with upper and lower seals 68, 70 on wall 22 and plate 24 for reducing the volume of internal pressure chamber 51 and thereby reducing load on air supply 60.

Figure 2:
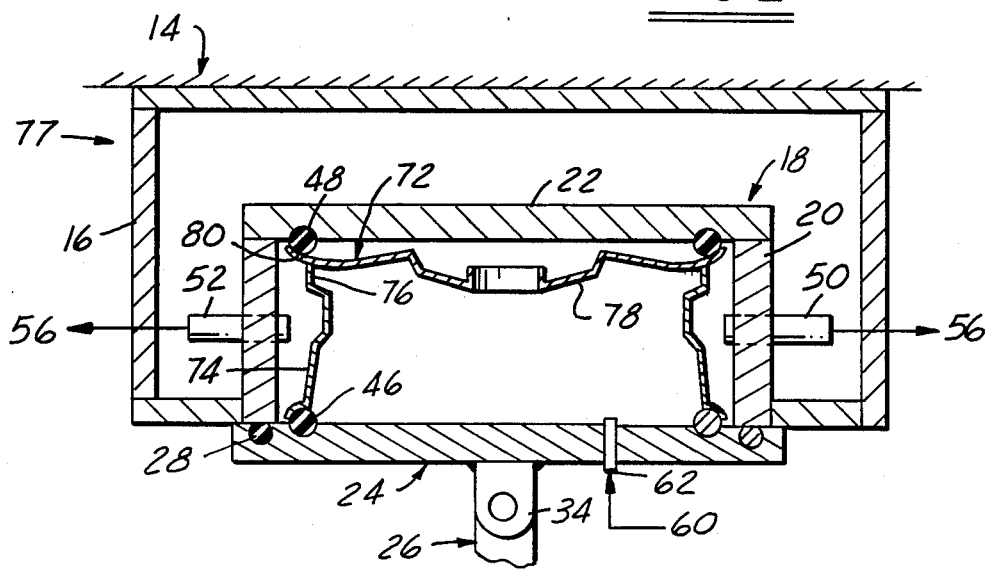
FIG. 2 is a fragmentary schematic illustration similar to that of FIG. 1 for testing wheel rims having the wheel mounting disk assembled thereto in accordance with a modified embodiment of the invention.

FIG. 2 illustrates a modified apparatus 77 in accordance with the invention for testing leak integrity of a front-wheel drive vehicle wheel 72 of the type in which the rim base 74 terminates at the axial edge of the outboard bead seat 76 and is spun or arc welded to the mounting disc 78 which forms the outboard bead-retaining flange 80. In apparatus 77, the microphones 50, 52, 54 are disposed in a circumferential array around wall 20 for enhanced detection of air leakage entirely around the wheel assembly. Insert 66 (FIG. 1) is deleted. Apparatus 77 of FIG. 2 is otherwise identical to that of FIG. 1.

It will be appreciated, of course, that size of housing 18 and positioning of seals 46, 48 depend upon the size and contour of the wheels or which rims under test. For example, although the rim edges in conventional wheels typically include identical coaxial rim flanges disposed in parallel planes perpendicular to the wheel rims as illustrated in the drawing, such need not be the case in practice of the present invention in its broadest aspects. It will also be appreciated from the foregoing discussion that the term "wheel rim" includes both the wheel rim segment alone and the rim portion of a complete rim and disc wheel assembly.

Figure 3:
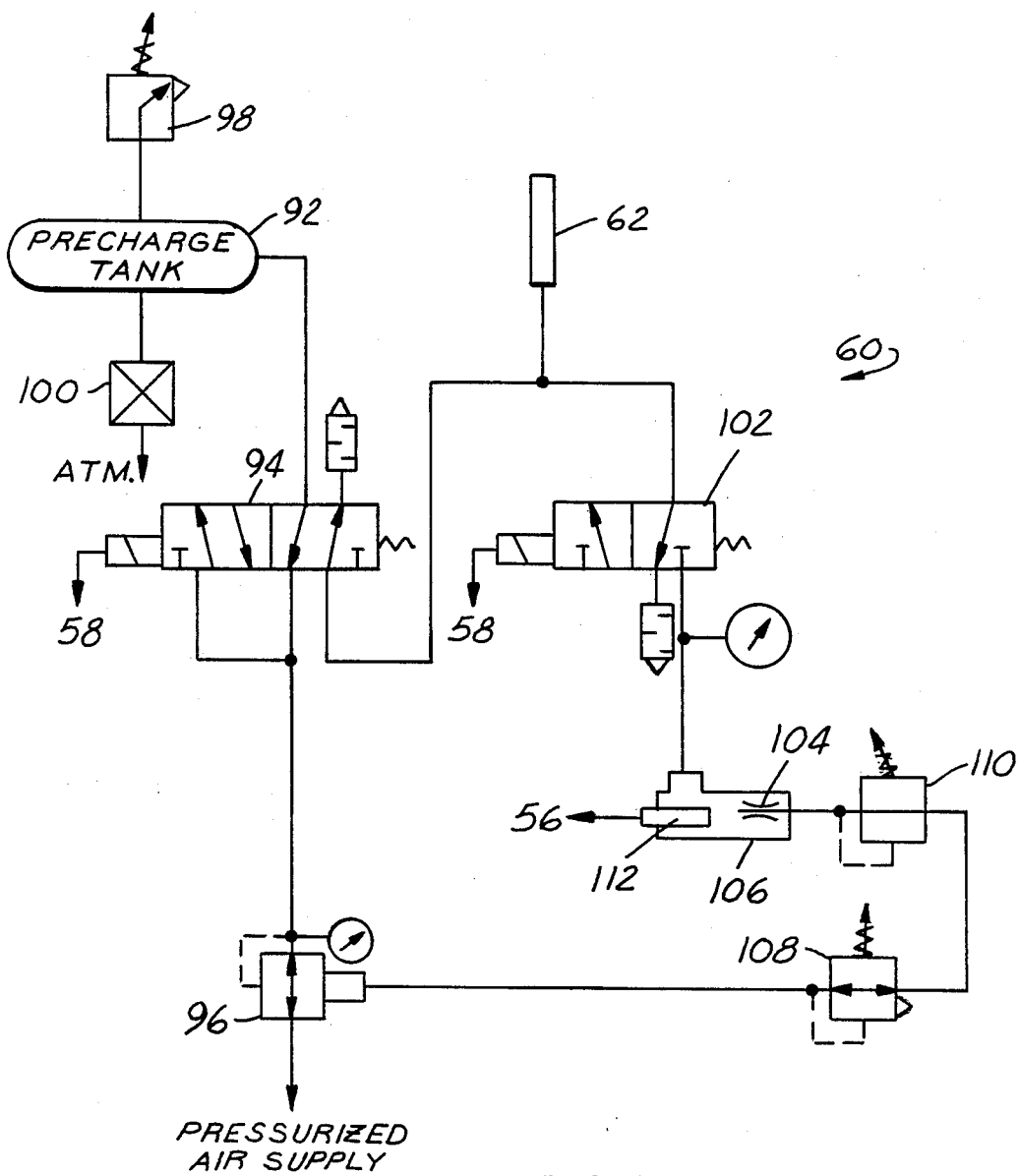
FIG. 3 is a schematic diagram of the air supply system 60 in FIG. 1 in accordance with a presently preferred embodiment of the invention.

FIG. 3 is a schematic diagram of air supply 60 (FIG. 1) in accordance with a presently preferred embodiment of the invention. A precharge chamber or tank 92 is normally connected by a solenoid value 94 through a regulator 96 to a source of compressed air, such as a pressurized plant air supply. Precharge tank 92 also has a pressure relief port 98 and a port coupled through a drain 100 to atmosphere. Nozzle 62 is coupled to normally-closed ports of value 94 whose solenoid is connected to apparatus control electronics 58 (FIG. 1). Nozzle 62 is also connected through normally-closed ports of a solenoid valve 102, and through an orifice 104 in a test chamber 106 to the plant air supply. Such interconnection also includes a pressure regulator 108 and a relief value 110. The solenoid of value 102 is connected to control electronics 58. A microphone 112 is positioned within enclosure 106 and is connected to leak detection electronics 56 (FIG. 1) for supplying thereto electrical signals indicative ultrasonic radiation emitted by passage of air through orifice 104 within chamber 106.

In operation of air supply 60, recharge tank 92 is normally connected to the pressurized air supply, as shown in FIG. 3, while a workpiece is withdrawn from housing 18 (FIG. 1) following completion of a test cycle, and while a new workpiece is positioned within the test housing. Tank 92 may thus precharge relatively slowly to some predetermined air pressure, such as 150 psi, while the workpiece transfer operation takes place. After the workpiece is positioned within the test housing, solenoid valve 94 is activated by control electronics 58 (FIG. 1) so as to connect precharge tank 92 to nozzle 62 and thereby rapidly dump air from the precharge tank to chamber 51 (FIG. 1). Volume and precharge pressure between tank 92 are coordinated with the volume to be pressurized with the test chamber—e.g., volume 51 in FIG. 1—obtain preselected workpiece test pressure. Chamber 51 is thus rapidly filled some that monitoring of microphones 50-54 may proceed forthwith. In working embodiments of the invention, it has been found that use of precharge tank 92 for rapidly charging the workpiece test chamber reduces total test cycle time on the order of 25% as compared with charging the test chamber directly from the plant air supply as in the prior art.

With the workpiece test chamber 51 thus rapidly charged, solenoid valve 94 is deactivated; and solenoid valve 102 is activated so as to connect nozzle 62 to the plant air supply through chamber 106 and orifice 104. In the event of a gross air leak at the workpiece, make-up air flowing through orifice 104 activates ultrasonic microphone 112 which feeds an appropriate electronic signal to leak detection electronics 56 (FIG. 1). If such gross leak is not detected, solenoid valve 102 is deactivated, solenoid valve 94 is reactivated, and microphones 50-54 are monitored as previously described. To maximize cycle time, the gross leak detection circuitry may be employed at a separate test station.

The invention claimed is:

1. Apparatus for testing leak integrity of a plurality of workpieces comprising: an air-tight housing, automatic transfer means for sequentially feeding, positioning and removing said plurality of workpieces to and from sealing engagement with portions of said housing so as to form first and second chambers within said housing internally and externally of said workpiece, means for supplying air under pressure from a source of compressed air to one of said chambers, and means for detecting leakage of air through the workpiece into the other of said chambers and thereby indicating absence of leak integrity at the workpiece; characterized in that said means for supplying air under pressure comprises:

means forming a precharge chamber separate from said housing and said source, means for precharging said precharge chamber to predetermined pressure from said source of compressed air while said automatic transfer means is positioning a workpiece in said housing, and means for connecting said precharge chamber to said one of said first and second chambers independently of said source when the workpiece is positioned in sealing engagement with said portions of said housing to dump air rapidly from said precharge chamber to said one of said first and second chambers independently of air flow of said source, whereby workpiece test cycle time is reduced.

2. The apparatus set forth in claim 1 wherein said means for precharging said precharge chamber and said means for dumping air from said precharge chamber into said one chamber together comprises a solenoid valve for alternately connecting said precharge chamber to said source of compressed air and to said one chamber.

3. The apparatus set forth in claim 1 wherein said leakage-detecting means comprises at least one microphone for detecting emission of ultrasonic energy as a function of leakage of air through the workpiece.

4. The apparatus set forth in claim 3 wherein said airsupplying means further comprises means for selectively directly connecting said one chamber to said source through an orifice independently of said precharge chamber, and a microphone responsive to flow of air through said orifice for indicating a gross leakage condition at the workpiece.

5. The apparatus set forth in claim 4 wherein said means for precharging said precharge chamber and said means for dumping air from said precharge chamber into said one chamber together comprises a solenoid valve for alternately connecting said precharge chamber to said source of compressed air and to said one chamber.

6. The apparatus set forth in claim 5 wherein said selectively—directly—connecting means comprises a second solenoid valve for selectively connecting said one chamber to said orifice.

7. Apparatus for testing leak integrity of a workpiece comprising: an air-tight housing, means for positioning a workpiece within said housing in sealing engagement with portions of said housing so as to form first and second chambers within said housing internally and externally of the workpiece, means for supplying air under pressure to one of said chambers from a compressed air source, and means for detecting leakage of air through the workpiece into the other of said chambers and thereby indicating absence of leak integrity at the workpiece, characterized in that said means for supplying air under pressure comprises:

means forming a precharge chamber separate from said housing and said source, means for precharging said precharge chamber from said source of compressed air, and means for dumping air from said precharge chamber to said one of said chambers independently of said source when a workpiece is positioned in sealing engagement with said portions of said housing.

8. In a method of testing a sequence of workpieces against air leakage which includes the steps of:
(a) positioning each workpiece in turn in a closed housing to form first and second sealed chambers within said housing internally and externally of the workpiece,
(b) directing air under pressure to one of said chambers,
(c) monitoring the other of said chambers for ultrasonic radiation indicative of an leakage through the workpiece,
(d) indicating a leak condition at the workpiece as a function of such radiation, and then
(e) removing the workpiece from said housing; the improvement for decreasing workpiece test cycle time in said housing wherein said step (b) comprises the steps of:
(b1) connecting a separate precharge chamber to a source of compressed air to charge said precharge chamber to a predetermined pressure while a previous workpiece is removed from said housing as recited in said step (e) and a new workpiece is positioned in said housing as recited in said step (a), and
(b2) rapidly dumping air from said precharge chamber to said one chamber when said new workpiece is sealingly positioned within said housing.

9. The method set forth in claim 8 comprising the additional improvement for detecting gross leaks at a workpiece in said housing of a size such that passage of air therethrough would not produce ultrasonic radiation, said additional improvement including the steps of:
(f) following said step (b2), directly connecting said one chamber to said source through an orifice, and
(g) monitoring for emission of ultrasonic radiation as a function of flow of air from said source through said orifice.

10. Apparatus for testing leak integrity of a plurality of workpieces comprising: an air-tight housing, automatic transfer means for sequentially feeding, positioning and removing said plurality of workpieces in sealing engagement with portions of said housing so as to form first and second chambers within said housing internally and externally of said workpiece, means for supplying air under pressure to one of said chambers, and means for detecting leakage of air through the workpiece into the other of said chambers and thereby indicating absence of leak integrity at the workpiece; characterized in that said means for supplying air under pressure comprises:

means forming a precharge chamber, means for precharging said precharge chamber to predetermined pressure from a source of compressed air while said automatic transfer means is positioning a workpiece in said housing, means for rapidly dumping air from said precharge chamber to said one of said chambers when the workpiece is positioned in sealing engagement with said portions of said housing, whereby workpiece test cycle time is reduced, means for selectively directly connecting said one chamber to said source through an orifice, and a microphone responsive to flow of air through said orifice for indicating a gross leakage condition at the workpiece, said means for precharging said precharge chamber and said means for dumping air from said precharge chamber into said one chamber together comprises a first solenoid valve for alternately connecting said precharge chamber to said source of compressed air and to said one chamber, said selectively —directly—connecting means comprising a second solenoid valve for selectively connecting said one chamber to said orifice.

* * * * *